O. BARTLETT AND H. FRYER.
OVERHEAD TRANSIT APPARATUS.
APPLICATION FILED SEPT. 24, 1919.
1,347,482.
Patented July 20, 1920.
2 SHEETS—SHEET 1.
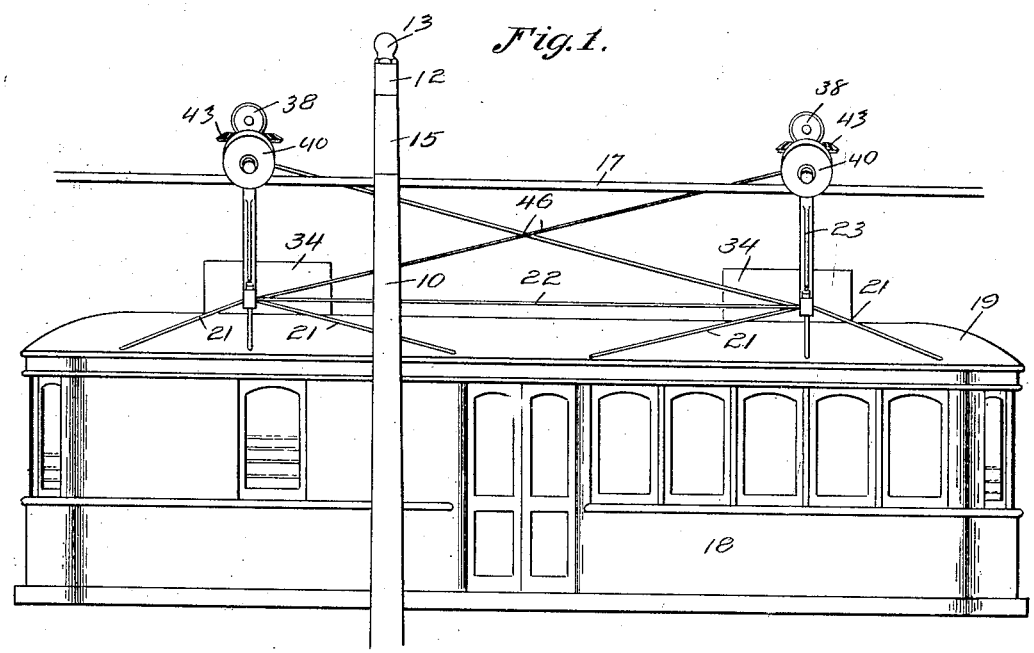
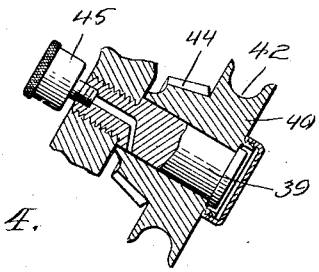
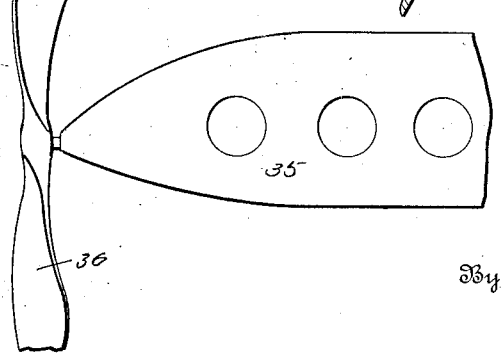
Inventor
Omar Bartlett.
Harry Fryer.
By Geo. P. Kimmel.
Attorney

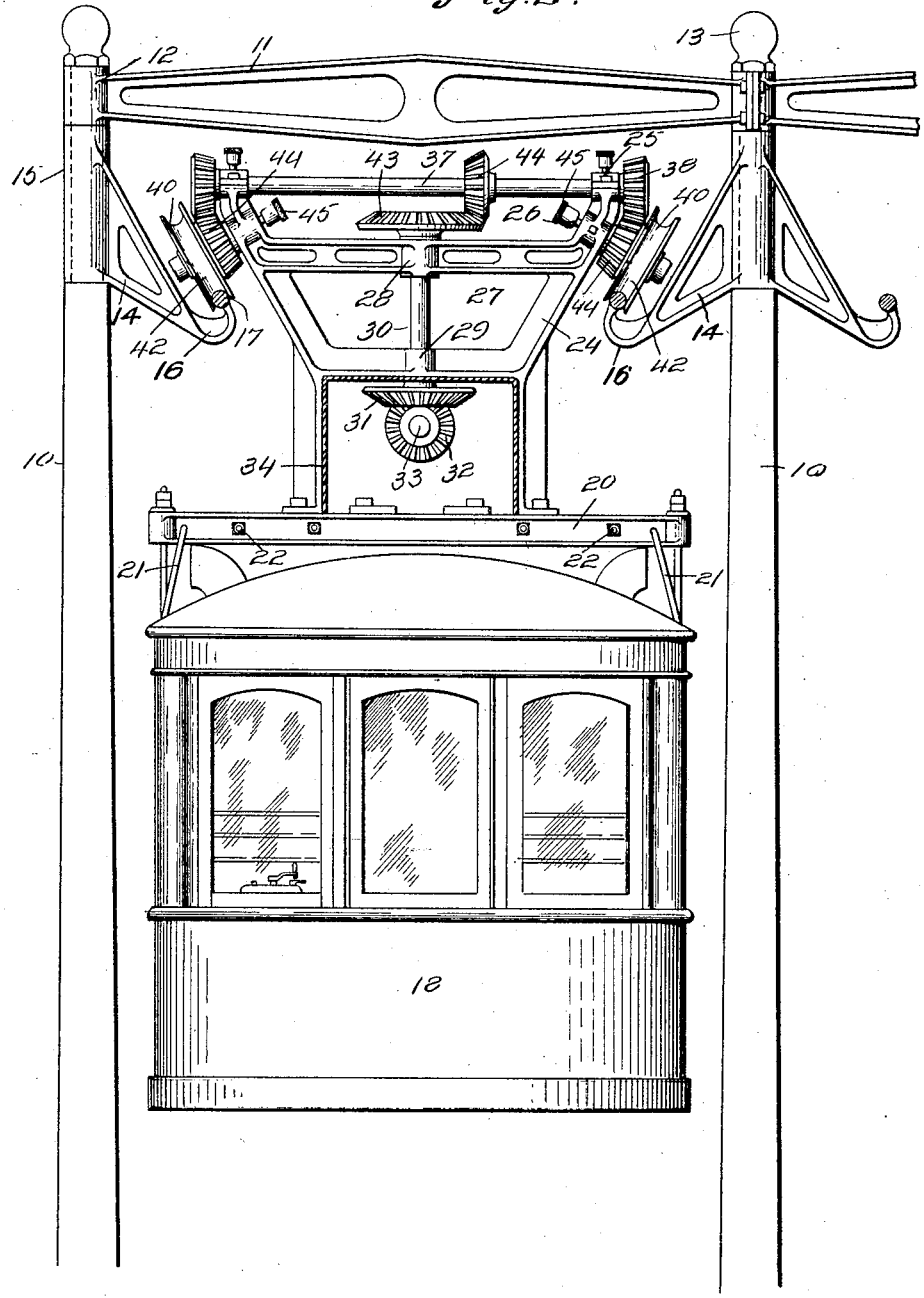

UNITED STATES PATENT OFFICE.

OMAR BARTLETT AND HARRY FRYER, OF LEWISTON, IDAHO.

OVERHEAD TRANSIT APPARATUS.

1,347,482.     Specification of Letters Patent.     Patented July 20, 1920.

Application filed September 24, 1919. Serial No. 325,892.

*To all whom it may concern:*

Be it known that we, OMAR BARTLETT and HARRY FRYER, citizens of the United States, residing at Lewiston, in the county of Nez Perce and State of Idaho, have invented certain new and useful Improvements in Overhead Transit Apparatus, of which the following is a specification.

The invention relates to a suspended railway construction, and more particularly to the class of overhead transit apparatus.

The primary object of the invention is the provision of an apparatus of this character wherein a carrier is suspended from an overhead track construction and is adapted to travel thereon, the power for operating the carrier being of any suitable source so that the said carrier can be advanced for transportation from one point to another, the overhead track construction and the suspension of the carrier being of novel form so as to avoid any possibility of accidents and to prevent the said carrier from becoming disengaged or disconnected from the overhead track construction in the transit thereof.

Another object of the invention is the provision of an apparatus of this character wherein the power for imparting motion to the carrier which, in this instance is in the form of a passenger car, is transmitted above the latter so that the said carrier will travel upon the overhead track construction, the carrier being suspended from the latter to assure an even motion without possibility of said carrier swinging as the weight of the carrier is equalized in the suspension thereof, thereby avoiding any rocking motion in the travel of the carrier from one point to another.

A further object of the invention is the provision of an apparatus of this character wherein the construction thereof and the mounting of the same in the overhead track eliminates the use of an underslung wheeled truck for supporting the carrier as is usual in surface railway construction.

A still further object of the invention is the provision of an apparatus of this character which is comparatively simple in construction, thoroughly reliable and efficient in its operation, strong, durable, and inexpensive to manufacture and install.

With this and other objects in view, the invention consists in the features of construction, combination and arrangement of parts as will be hereinafter fully described, illustrated in the accompanying drawings, and pointed out in the claims hereunto appended.

In the accompanying drawings:

Figure 1 is a fragmentary side elevation of an overhead track construction and a suspended carrier constructed in accordance with the invention.

Fig. 2 is a vertical sectional elevation showing the carrier in position and adjunct parts.

Fig. 3 is a fragmentary vertical sectional view through one of the traction rollers of the apparatus.

Fig. 4 is a fragmentary side elevation of a propelling motor, the same being one form of power source in the use of the apparatus.

Similar reference characters indicate corresponding parts throughout the several views in the drawings.

Referring to the drawings in detail A designates generally an overhead track construction and B the movable carrier of the apparatus. This track construction A comprises posts 10 which are anchored within the ground or roadbed at the desired spaced relation to each other to extend vertically for accommodating the passage of the carrier B therebetween, it being understood, of course, that the required number of posts are employed in the overhead track construction according to the variable extent thereof and mounted upon the upper ends of each pair of posts 10 is a cross brace 11, which may be of any desirable construction, in this instance in the form of a beam having the sleeve ends 12 which embrace the posts 11 immediately below the caps 13 on the upper ends thereof, the brace 11 being designed to hold the posts against spreading relative to each other and to give rigidity to the overhead track construction.

Carried by the pair of posts 10 below the braces 11 are track hangers 14 each being formed with a sleeve 15 embracing the posts 10 supporting the same and also formed with the hook shaped end 16 which has connected therewith the track rail 17, it being understood, of course, that two rails are arranged between the posts in parallelism with each other upon the hangers 14 thereon.

The carrier comprises a car body 18 of any approved type, in this instance in the form of a passenger coach, and disposed crosswise of the top 19 thereof spaced from opposite ends are cross sills or bolsters 20 which are supported elevated over said top 19 through the medium of truss rods 21 which are bolted or otherwise fastened to the sills or bolsters 20 and also to the top 19 of the body 18. Arranged between the sills or bolsters 20 and connected thereto are longitudinal truss rods 22 which together with the rods 21 rigidly hold the said sills or bolsters 20, while the rods 21 suspend the body 18 therefrom. Mounted upon each of the sills or bolsters 20 is a substantially H-shaped bracket 23, the same being bolted or otherwise secured to said sill or bolster and has its upper arms 24 thereof disposed in upwardly divergent relation to each other and formed with horizontal and angularly disposed bearings 25 and 26 respectively while between these arms 24 is a cross connecting web 27 formed with a center vertical bearing 28 and likewise the bracket 23 is formed with a central vertical bearing 29 in alinement with the said bearing 28, these bearings 28 and 29 have journaled therein a driven shaft 30 connected through the medium of meshing gears 31 and 32 respectively with the power shaft 33 of a driving motor of any approved construction. The motor is located within a suitable boxing or housing 34 within the bracket 23 above the body 18 of the carrier. It is, of course, to be understood that the power motor may be of the electric type or of internal combustion construction. It is contemplated to employ an aerial motor 35 of any ordinary well known construction having the usual bladed propeller 36 yet any other type of motor can be used.

Journaled in the horizontal bearings 25 is a transverse counter shaft 37 which has affixed to its opposite ends outside of the arms 24 of the bracket 23 pinions 38 while fixedly engaged in the angularly disposed bearings 26 are stub axles 39 having thereon traction rollers 40, the same being formed with pinions 41 meshing with the pinions 38 and these rollers 40 are disposed in downwardly convergent relation to each other and have peripheral grooves 42 for receiving the track rails 17. The traction rollers 40 are adapted to travel upon the track rails 17 when the carrier is in motion for transit from one point to another.

Secured to the driven shaft 30 is a beveled gear 43 which meshes with a pinion 44 affixed to the counter shaft 37 so that motion from the power shaft 33 of the motor will be transmitted to the counter shaft 37 whence the motion will be transmitted therefrom to the traction wheels 40 for the positive mobile of the carrier upon the overhead track construction.

The bearings 25 and 26 are fitted with suitable oil cups 45 for lubricating the shaft 37 and the traction wheels 40.

It is, of course, to be understood that the motor operating the power shaft 33 can be controlled in any suitable manner from the interior of the carrier 18 for the starting and stopping of the motor and also for varying the speed of the same.

The arrangements of the brackets 23 above the carrier 18 and centrally of the same and also with respect to the overhead track construction enables the said carrier to be moved upon the track construction without rocking motion and with smoothness and evenness over the track rails 17 as the weight of the carrier 18 sustains the same when suspended between the posts in a balanced position and by reason of the angular disposition of the traction rollers 50 there is no possibility of the same leaving the track rails 17 when the carrier is in motion, the weight of the carrier being equalized between the track rails 17 of the overhead track construction and there is no possibility of the traction wheels 40 jumping the rail 17 during the travel of the carrier.

The particular manner of suspension of the carrier 18 beneath the overhead track construction assures against excessive jars and vibrations incident to the travel of said carrier as the truss rods 21 and 22 will absorb shocks and jars during the momentum of the carrier in its suspended relation to the overhead track construction.

Arranged between the brackets 23 and connected thereto are crossed braces 46 which serve to sustain the brackets in vertical relation to each other and to prevent any rocking or play thereof upon the cross sills or bolsters 20 above the top 19 of the carrier 18.

From the foregoing it is thought that the construction and manner of operation of the apparatus will be clearly understood and therefore a more extended explanation has been omitted.

What is claimed is:

1. An apparatus of the character described, comprising spaced vertical uprights, track hangers secured to said uprights and having upturned rail supporting ends, track rails carried by said ends, a carrier, brackets on the carrier and having upwardly divergent portions, horizontal and angularly disposed bearings on said upwardly divergent portions, a counter shaft journaled in the horizontal bearings, stub axles carried in the angularly disposed bearings, peripherally grooved traction rollers on said axles and engaging said track rails, gear connections between said shaft and said rollers, and motor driven connections coöperating with said shaft.

2. An apparatus of the character described, comprising spaced vertical uprights, track hangers secured to said uprights and having upturned rail supporting ends, track rails carried by said ends, a carrier, brackets on the carrier and having upwardly divergent portions, horizontal and angularly disposed bearings on said upwardly divergent portions, a counter shaft journaled in the horizontal bearings, stub axles carried in the angularly disposed bearings, peripherally grooved traction rollers on said axles and engaging said track rails, gear connections between said shaft and said rollers, motor driven connections coöperating with said shaft, cross sills fixed to said brackets, and truss rods connecting the carrier with said cross sills for the suspension of the carrier beneath the latter.

3. An apparatus of the character described, comprising spaced vertical uprights, track hangers secured to said uprights and having upturned rail supporting ends, track rails carried by said ends, a carrier, brackets on the carrier and having upwardly divergent portions, horizontal and angularly disposed bearings on said upwardly divergent portions, a counter shaft journaled in the horizontal bearings, stub axles carried in the angularly disposed bearings, peripherally grooved traction rollers on said axles and engaging said track rails, gear connections between said shaft and said rollers, motor driven connections coöperating with said shaft, cross sills fixed to said brackets, truss rods connecting the carrier with said cross sills for the suspension of the carrier beneath the latter, and means for bracing the uprights.

4. An apparatus of the character described, comprising spaced vertical uprights, track hangers secured to said uprights and having upturned rail supporting ends, track rails carried by said ends, a carrier, brackets on the carrier and having upwardly divergent portions, horizontal and angularly disposed bearings on said upwardly divergent portions, a counter shaft journaled in the horizontal bearings, stub axles carried in the angularly disposed bearings, peripherally grooved traction rollers on said axles and engaging said track rails, gear connections between said shaft and said rollers, motor driven connections coöperating with said shaft, cross sills fixed to said brackets, truss rods connecting the carrier with said cross sills for the suspension of the carrier beneath the latter, means for bracing the uprights, and a housing mounted in each bracket for accommodating a motor.

In testimony whereof we affix our signatures hereto.

OMAR BARTLETT.
HARRY FRYER.